United States Patent [19]

Murofushi et al.

[11] Patent Number: 5,709,801
[45] Date of Patent: Jan. 20, 1998

[54] REMOVAL OF LIQUID FROM PULLULAN

[75] Inventors: Kanji Murofushi; Shigehiro Nagura; Jiro Moriya, all of Niigata-ken, Japan

[73] Assignees: Shin-Etsu Chemical Co., Ltd., Tokyo, Japan; Shin-Etsu Bio, Inc., San Diego, Calif.

[21] Appl. No.: 708,847

[22] Filed: Sep. 9, 1996

[30] Foreign Application Priority Data

Sep. 12, 1995 [JP] Japan ................................ 7-233563

[51] Int. Cl.$^6$ ................................ B01D 37/00
[52] U.S. Cl. ............. 210/770; 210/780; 536/123.12; 435/102
[58] Field of Search ................. 435/101, 102; 210/768, 770, 780; 209/268; 100/37, 144, 145; 536/123.12

[56] References Cited

U.S. PATENT DOCUMENTS

| | | |
|---|---|---|
| 3,912,591 | 10/1975 | Kato et al. |
| 3,959,009 | 5/1976 | Kato et al. |
| 4,004,977 | 1/1977 | Kato et al. |
| 4,321,140 | 3/1982 | Luthi . |
| 5,315,003 | 5/1994 | Maruyama et al. ............ 536/124 |

FOREIGN PATENT DOCUMENTS

| | | |
|---|---|---|
| 2259905 | 8/1975 | France . |
| 2262109 | 9/1975 | France . |

OTHER PUBLICATIONS

Patent Abstract of Japan, vol. 18, No. 191, 4 Apr. 1994 & JP 05 345801 (Shin-Etsu Chemical Co. Ltd).
Asahi Press, "Continuous Dehydrating Mechanical Press" by Asahi Koki Co., Ltd.
Grant & Hackh's Chemical Dictionary, 5th ed, ©1987, p. 334.

Primary Examiner—Robert J. Popovics
Attorney, Agent, or Firm—McAulay Fisher Nissen Goldberg & Kiel, LLP

[57] ABSTRACT

Pullulan is precipitated from an aqueous solution by mixing with a hydrophilic organic solvent incapable of dissolving pullulan. Solid pullulan is then separated from the liquid component of the dispersion by feeding the dispersion into a V-type disk press having a pair of discoid screens arranged so that the distance between them decreases as they are rotated. The pullulan dispersion is pressed by the discoid screens, recovering the liquid component through the screens. The resulting low-liquid-content pullulan continues to rotate together with the screens to an outlet, where it is discharged from the press.

13 Claims, 3 Drawing Sheets

REMOVAL OF LIQUID FROM PULLULAN

FIELD OF THE INVENTION

This invention relates to a method for the recovery of pullulan from an aqueous solution of pullulan. In particular, this invention relates to a method for using a press to remove liquid from pullulan precipitated from a fermentation culture and to a press apparatus for use in the recovery process.

BACKGROUND OF THE INVENTION

Pullulan is a water-soluble polysaccharide produced by the black yeast *Aureobasidium pullulans* cultured in an aqueous medium combining a carbon source, such as monosaccharides, starch breakdown products and the like, with an appropriate nitrogen source. The pullulan produced is recovered from the culture by mixing the fermented solution, or broth, with a hydrophilic organic solvent such as isopropanol to precipitate the pullulan and then separating the precipitated pullulan. Similarly, pullulan can be separated from an aqueous solution thereof by mixing the solution with a hydrophilic organic solvent such as isopropanol to precipitate the pullulan.

Conventionally, the separation of precipitated pullulan from a dispersion thereof has been carried out by liquid removal with an extrusion type centrifugal separator or by pressure or vacuum filtration.

However, when the above-described separation techniques are employed, the water content of the pullulan after liquid removal remains high and requires a large energy load in a subsequent drying step. Moreover, when a centrifugal separator is used, it is necessary to rotate a screen basket at high speed in the presence of an organic solvent. This technique is undesirable because it requires considerable power consumption and careful safety precautions. Other methods for coping with the high water content have been attempted. These include a method wherein pullulan is repeatedly washed with a hydrophilic organic solvent (Japanese Kokai No. Sho 5136360). Also known is a method in which the precipitated pullulan is recovered from the dispersion by use of a liquid cyclone and an airtight centrifugal Separator (Japanese Kokai No. Sho 50-116692 corresponding to U.S. Pat. No. 3,959,009). However, these methods have proven disadvantages, because the repeated washing of the product requires a large mount of the hydrophilic organic solvent resulting in inefficient productivity and waste disposal problems.

SUMMARY OF THE INVENTION

Accordingly, it is an object of the present invention to provide a liquid removal method for use in the separation and recovery of precipitated pullulan wherein the degree of liquid removal can be enhanced to reduce the energy load of the drying step and, moreover, continuous liquid removal can be effected at low power consumption.

The above object of the present invention can be accomplished by providing a method for the removal of liquid from an aqueous dispersion of precipitated pullulan which comprises feeding the dispersion into a V-type disk press having a pair of discoid screens arranged so that the distance therebetween decreases as they are rotated, pressing the pullulan dispersion between the pair of discoid screens to recover the liquid component through the screens, and recovering the resulting low-liquid-content pullulan component by rotating it together with said screens and discharging it from said press.

It is understood that the aqueous dispersion of pullulan may be obtained by mixing an aqueous solution containing pullulan with a hydrophilic organic solvent incapable of dissolving pullulan to precipitate pullulan. In addition, the aqueous dispersion may be the fermented broth itself in which the pullulan has been precipitated, or a dispersion produced by dissolving pullulan in an aqueous solution and then precipitating it therefrom.

Further applicability of the present invention will become apparent from the following descriptions of the preferred embodiment and specific examples. However, it should be understood that these descriptions of the embodiment and specific examples are given by way of illustration only and should not be considered as limiting the invention. Various changes and modifications within the spirit of the invention will become apparent to those skilled in the art and are intended to come within the scope of the appended claims.

Figure 1:
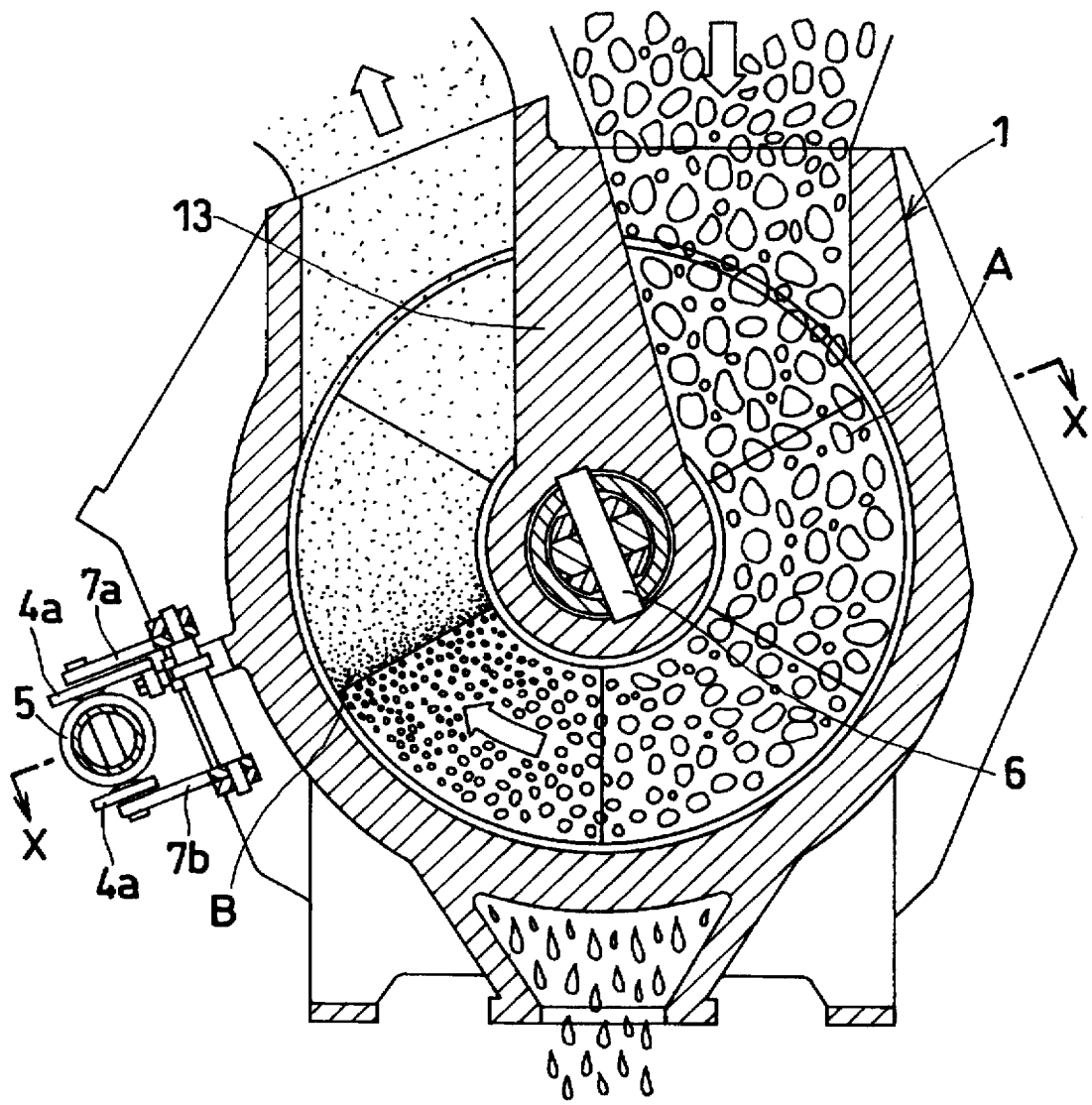
FIG. 1 is a sectional front view illustrating the essential components of a V-type disk press for use in the present invention.
Figure 2:
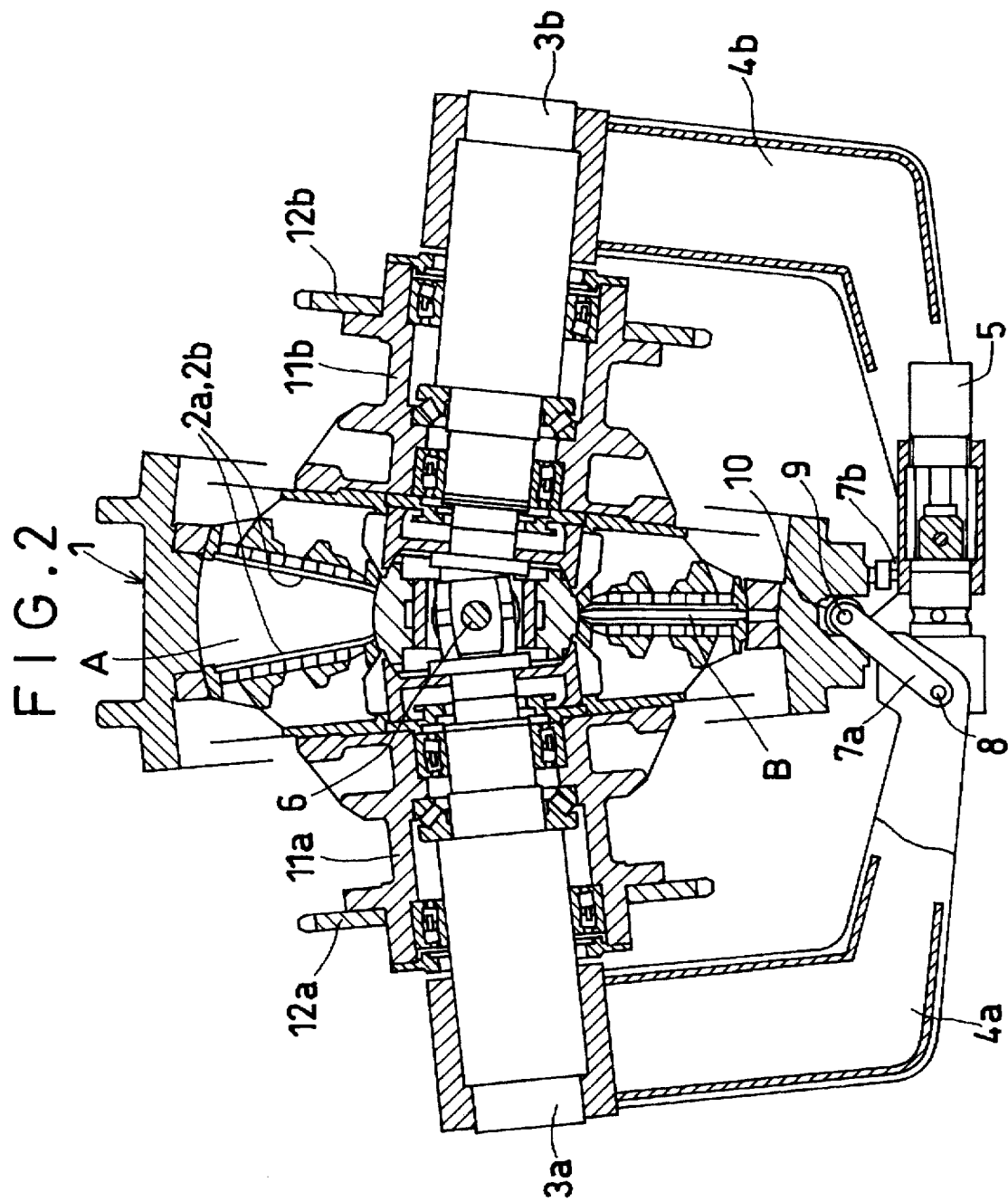
FIG. 2 is a sectional view taken along line X—X in FIG. 1.

DESCRIPTION OF THE PREFERRED EMBODIMENT:

FIGS. 1 and 2 illustrate one embodiment of a V-type disk press used in a method for removing liquid from pullulan. This V-type disk press consists essentially of a main body 1, a pair of screens 2a and 2b, a pair of spindles 3a and 3b, a pair of supporting arms 4a and 4b, and a hydraulic or spring-loaded cylinder 5.

Figure 3:
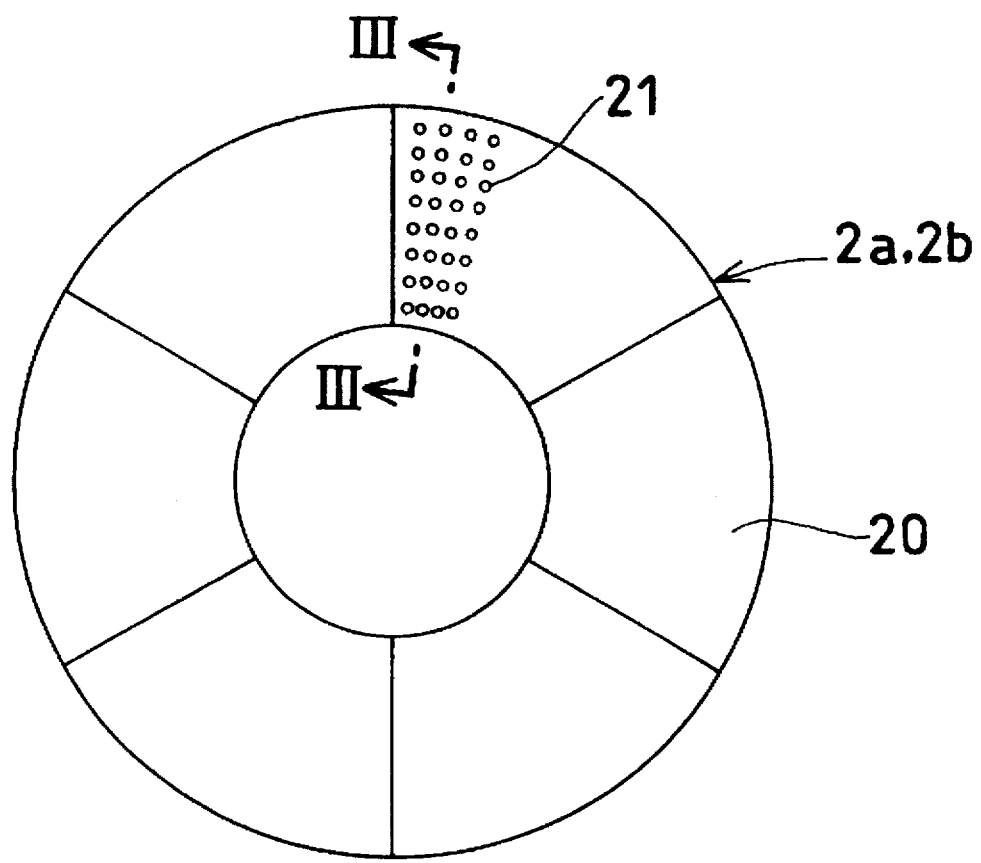
FIG. 3 is a front view of either of screens 2a and 2b.
Figure 4:
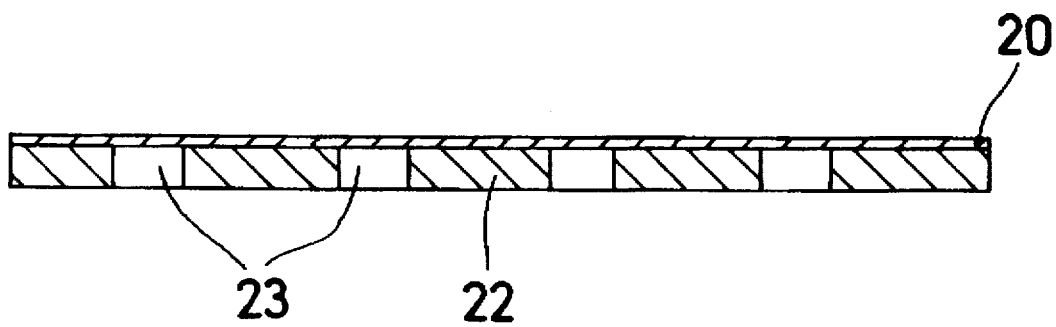
FIG. 4 is a sectional view taken along line III—III in FIG. 3.

As can be seen from the figures, the aforesaid pair of screens 2a and 2b are configured to have a discoid (or, more precisely, a conical form and are fixed to rotating supports 11a and 11b, respectively. The distance or space between screens 2a and 2b is largest on a raw material inlet side A and smallest on a pressure side B which is angularly spaced about 180 degrees from inlet side or position A. When viewed from the front, screens 2a and 2b are each divided into 6 segments as shown in FIG. 3. Each segment comprises a perforated or punched metal plate 20 in which a large number of evenly distributed small apertures 21 are formed. The total open area of each screen segment is defined by the size of apertures 21 and the number of apertures 21. As can be seen from FIG. 4, the back surface of metal plate 20 is suitably strengthened by a reinforcing plate 22 so as to withstand the pressure applied during pressing. This reinforcing plate 22 is provided with a plurality of evenly distributed large apertures 23.

In this embodiment, the size of the individual small apertures 21 of screen 2a and 2b (i.e., the mesh size) is preferably not greater than 1 $mm^2$, and screens having circular or slit-like apertures are used. If the screen opening is greater than 1 $mm^2$, a considerable loss may be caused owing to the passage of pullulan through the screens during pressing.

As shown in FIG. 2, the aforesaid pair of spindles 3a and 3b are disposed on the left and right sides of main body 1, fixed to and supported by supporting arms 4a and 4b, respectively, and connected pivotally to each other by a center pin 6 at the center of main body 1. Both ends of center pin 6 are fixed to main body 1. Supporting arms 4a and 4b are configured to have the shape of the letter L. Arms 4a and 4b fixedly support spindles 3a and 3b at one end as described above and are connected to each other at the other end via a hydraulic or spring-loaded cylinder 5. In the neighborhood of cylinder 5, supporting arms 4a and 4b are displaceably connected to main body 1 by links 7a and 7b, respectively. Reference numeral 8 designates a center of revolution of link 7a with respect to supporting arms 4a, and reference numeral 9 designates a common center of revolution of links 7a and 7b. A center of revolution of link 7b with respect to supporting arm 4b is similarly provided but cannot be seen in FIG. 2. Center of revolution 9 reciprocates in the manner of a slider within a groove 10.

Main body 1, center pin 6, supporting arm 4a which is integral with spindle 3a, center of revolution 8, link 7a, center of revolution 9 and groove 10 form a kind of revolving slider crank mechanism. Similarly, main body 1, center pin 6, supporting arm 4b integral with spindle 3b, center of revolution 8, link 7b, center of revolution 9 and groove 10 form a kind of revolving slider crank mechanism. As a result, by regulating the mutual angle of links 7a and 7b through actuation of cylinder 5, it is possible to regulate the angle between spindles 3a and 3b and thereby control the degree of opening of screens 2a and 2b and hence the pressing force.

In this embodiment, the above-described revolving slider crank mechanisms are used to control the degree of opening of screens 2a and 2b. However, any other mechanism that can regulate the angle between spindles 3a and 3b (e.g., a quadric crank mechanism formed by substituting a link for the slider) can alternatively be used in the present invention.

As shown in FIG. 2, the supports 11a and 11b are rotatably supported on spindles 3a and 3b by means of bearings (not designated) and are rotated by a driving force (not shown) transmitted to integrally formed sprockets 12a, 12b with the aid of chains (not shown). Alternatively, any other mechanism (e.g., V-belt transmission) may be used for power transmission to rotating supports 11a and 11b.

The following procedure is carried out prior to the pressing of a pullulan dispersion by use of the V-type disk press illustrated in FIGS. 1 and 2.

Initially, a pullulan-containing fermented solution is obtained by preliminary and main cultivation using a suitable culture medium. This fermented solution is then sterilized by heating. An aqueous solution of pullulan may alternatively be obtained by filtration or chemical treatment of fermented solutions, or other methods. The present invention is not limited by the pullulan concentration, pH, temperature, or composition (e.g., the concentrations of other additives) of the aqueous solution.

The resulting culture solution (or other aqueous solution containing pullulan) is mixed with a hydrophilic organic solvent incapable of dissolving pullulan to obtain a dispersion containing precipitated pullulan. Hydrophilic organic solvents which may be used to precipitate pullulan include alcohols (such as methanol, ethanol, and isopropanol), dioxane, acetone, tetrahydrofuran and the like. No particular limitation is placed on the method for precipitating pullulan.

If a method for preparing a free precipitate by (I) continuously feeding an aqueous solution of pullulan and a hydrophilic organic solvent incapable of dissolving pullulan, (ii) mixing them to precipitate pullulan, and (iii) simultaneously cutting the precipitated pullulan into smaller particles or fibers (as disclosed in U.S. Pat. No. 5,315,003) is employed, the precipitation step and the separation and liquid removal step in accordance with the present invention can readily be carried out continuously. The resulting dispersion is continuously fed to a V-type disk press designed for continuous pressing such as that shown in FIGS. 1 and 2, either directly or by way of a constant-rate feeding device such as a transfer pump or a rotary valve to raw material inlet A.

The dispersion containing precipitated pullulan is fed into raw material inlet A, held between screens 2a and 2b, and gradually pressed as screens 2a and 2b are rotated. The liquid components of the dispersion are pressed through the holes and flow out the back sides of screens 2a and 2b. After the highest degree of pressing is effectuated at position B, the distance between screens 2a and 2b increases gradually and the pressed pullulan in the form of a semi-dry cake is discharged along a scraper 13 disposed between screen 2a and 2b at a discharge position or station. Thus is the pullulan component of the dispersion successfully recovered. In the present invention, the space between screens 2a, 2b and scraper 13 is preferably 1 mm or less. If it is more than 1 mm, pullulan will not be recovered effectively resulting in clogging of the screens, which in turn results in a lower rate of liquid removal and a lower percentage of recovery.

The rate at which the dispersion containing precipitated pullulan is fed to the V-type disk press may be suitably chosen according to the pullulan concentration in the dispersion, the state of precipitation of pullulan, and the like. The maximum feed rate of the dispersion is that at which the rate of passage of the liquid component through the screens equilibrates with the feed rate. At higher feed rates, the liquid component may not be fully removed from the cake, resulting in a cake containing an undesirable mount of the liquid component.

Unlike centrifugal separators utilizing a difference in specific gravity, the V-type disk press described herein uses applied pressure. Thus, the degree of liquid removal can be controlled by the pressure and the rotational speed of the screens, so that the liquid content of pullulan can be reduced to as low as 40–50% by weight. Consequently, the cleaning and purifying effect of the hydrophilic organic solvent is improved and, moreover, the energy load of the succeeding drying step is reduced.

In the V-type disk press illustrated in FIGS. 1 and 2, pressing can usually be done by rotating the screens at a low speed of about 1 to 12 rpm (for a screen diameter of 0.5 to 1.5 m). Thus, the V-type disk press consumes much less power than centrifugal separators, which operate at rotational speeds of 500 to 2,000 rpm. Moreover, the V-type disk press avoids the safety risks of high-speed rotation of organic solvents present in centrifugal separators.

TESTING EXAMPLE 1

A main culture medium having the composition given below was placed in a 2,000-liter fermenter, inoculated with a culture of *Aureobasidium pullulans* obtained from a 24-hour preliminary cultivation, and incubated with aeration and stirring for two days to obtain a fermented solution containing 20 g/L of pullulan. (Composition of main culture medium)

| Sucrose | 100 g/L |
|---|---|
| $(NH_4)_2 \cdot HPO_4$ | 1 g/L |
| $FeSO_4 \cdot 7H_2O$ | 0.01 g/L |

| | |
|---|---|
| MnSO$_4$.7H$_2$O | 0.01 g/L |
| ZnSO$_4$.7H$_2$O | 0.01 g/L |
| Water | 1,170 L |
| pH | 7.0 |

The fermented solution was heated at 60° C. for 30 minutes to kill the pullulan producing bacterium and then fed at a rate of 1,000 liters per hour into a pump mill having a built-in rotary turbine. At the same time, isopropanol having a water content of 15% by weight was fed into the pump mill at a rate of 1,500 liters per hour. In this way, a dispersion containing precipitated pullulan was formed.

This dispersion was fed into a V-type disk press having the same construction as the embodiment illustrated in FIGS. 1 and 2 (Asahi Press C-35, manufactured by Asahi Koki K.K.; having a screen diameter of 350 mm, a screen aperture diameter of 0.5 mm, a screen thickness of 0.5 mm, a pressing pressure of 75 kg/cm$^2$, a rotational speed of 6 rpm and 1 mm of a space between the screens and the scraper) at a rate of 1,500 liters per hour. Liquid removal was carried out continuously for 3 hours. The primary pullulan product thus obtained had a liquid content of 63% by weight. During the continuous operation, neither clogging of the screens nor a reduction in the degree of liquid removal was noted and a good liquid-removing effect was achieved.

Then 50 kg of the primary pullulan product was placed in a 500-liter tank and 1.5 parts by weight of isopropanol (having a water content of 15% by weight) was added thereto, followed by stirring. The resulting dispersion was fed again to the V-type disk press operated under the same conditions as described above. The secondary pullulan product thus obtained had a liquid content of 50% by weight. During continuous operation, neither clogging of the screens nor a reduction in the degree of liquid removal was noted.

TESTING EXAMPLE 2

An aqueous solution containing 3% by weight of pullulan was used in place of the pullulan-containing fermented solution used in Testing Example 1. This aqueous solution was mixed with isopropanol in the same manner as in Testing Example 1 to obtain a dispersion containing precipitated pullulan.

When the liquid component was removed from this dispersion under the conditions of Testing Example 1, the primary pullulan product had a liquid content of 65% by weight.

COMPARATIVE EXAMPLE

The dispersion of Testing Example 1 was fed into a V-type disk press having the same construction as the embodiment illustrated in FIGS. 1 and 2 (Asahi press C-35, manufactured by Asahi Koki K.K.; having a screen diameter of 350 mm, a screen aperture diameter of 0.5 mm, a screen thickness of 0.5 mm, a pressing pressure of 75 kg/cm$^2$, a rotational speed of 6 rpm, and at a rate of 1,500 liters per hour) but with 1.2 mm of a space between the screens and the scraper.

During continuous liquid removal, the rate of liquid removal declined markedly over time. Eventually, the screens clogged completely and isopropanol solution flooded from the outlet.

The invention having been thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for the recovery of pullulan, comprising the steps of:
   a) providing a V-type disk press having an inlet, an outlet, and a pair of discoid screens arranged so that the distance therebetween decreases as the screens are rotated;
   b) feeding, to the inlet, a dispersion containing precipitated pullulan;
   c) rotating said screens from said inlet about respective axes of rotation so that the distance between said screens decreases;
   d) pressing said dispersion between said screens during said step of rotating;
   e) squeezing a liquid component of said dispersion through said screens during said step of pressing;
   f) continuing to rotate said screens about said axes after squeezing said liquid component from said dispersion; and
   g) discharging a semi-dry cake of pullulan from between said screens at the outlet during step f) by scraping said semi-dry cake of pullulan from said screens by rotating the semi-dry pullulan component past a scraper member, the space between the screens and the scraper being 1 mm or less.

2. The method claimed in claim 1 wherein the rate at which liquid component is squeezed through said screens is in equilibrium with the rate of feeding the dispersion into the inlet.

3. The method claimed in claim 1 wherein said step c) is at a speed of about 1 to 12 rpm.

4. The method defined in claim 1 wherein step b) includes the steps of:
   h) preparing an aqueous solution of pullulan;
   i) providing a hydrophilic organic solvent incapable of dissolving pullulan; and
   j) mixing said aqueous solution and said organic solvent to form said dispersion containing precipitated pullulan.

5. The method claimed in claim 4 wherein said step of feeding further comprises the step of cutting the precipitated pullulan simultaneously with step j).

6. The method claimed in claim 1 wherein steps b), c), d), e) and g) are performed continuously.

7. A method for the recovery of pullulan, comprising the steps of:
   a) providing a press having an inlet, an outlet, and a pair of screens facing one another to define a pressing space therebetween.
   b) feeding, to the inlet, a dispersion containing precipitated pullulan;
   c) pressing said screens towards one another to squeeze said dispersion between said screens;
   d) forcing a component of said dispersion through said screens during said step of pressing; and
   e) discharging pullulan in the form of a semi-dry cake from between said screens at the outlet upon completion of said step of pressing and discharging by scraping said semi-dry cake of pullulan from said screens by rotating the semi-dry pullulan component past a scraper member, the space between the screens and the scraper being 1 mm or less.

8. The method claimed in claim 7 wherein said press is a V-type disk press having a pair of discoid screens arranged so that the distance therebetween decreases as the screens are rotated, step c) includes the step of rotating said screens about respective axes of rotation.

9. The method claimed in claim 8 wherein said step of rotating is at a speed of about 1 to 12 rpm.

10. The method claimed in claim 7 wherein the rate at which liquid component is forced through said screens is in equilibrium with the rate of feeding the dispersion into the inlet.

11. The method claimed in claim 7 wherein said step of feeding includes the steps of:

f) preparing an aqueous solution of pullulan;

g) providing a hydrophilic organic solvent incapable of dissolving pullulan; and h) mixing said aqueous solution and said organic solvent to form said dispersion containing precipitated pullulan.

12. The method claimed in claim 11 wherein step b) further comprises the step of cutting the precipitated pullulan simultaneously with said step of mixing.

13. The method claimed in claim 7 wherein steps b), c), d) and e) are performed continuously.

* * * * *